(12) United States Patent
Lee et al.

(10) Patent No.: US 7,692,753 B2
(45) Date of Patent: Apr. 6, 2010

(54) FLAT PANEL DISPLAY DEVICE

(75) Inventors: Chang Hoon Lee, Paju-si (KR); Mon Soo Kang, Daegu (KR)

(73) Assignee: LG. Display Co., Ltd., Seoul (KR)

( * ) Notice: Subject to any disclaimer, the term of this patent is extended or adjusted under 35 U.S.C. 154(b) by 948 days.

(21) Appl. No.: 11/479,473

(22) Filed: Jun. 30, 2006

(65) Prior Publication Data

US 2007/0091249 A1      Apr. 26, 2007

(30) Foreign Application Priority Data

Oct. 25, 2005    (KR) .................. 10-2005-0100887

(51) Int. Cl.
*G02F 1/1333*    (2006.01)

(52) U.S. Cl. ...................... 349/152; 349/192

(58) Field of Classification Search ............ 349/40, 349/54, 138, 192, 152; 257/59, 72
See application file for complete search history.

(56) References Cited

U.S. PATENT DOCUMENTS

| 6,184,948 B1 * | 2/2001 | Lee ............................ 349/54 |
| 2007/0164289 A1 * | 7/2007 | Jung .......................... 257/72 |

* cited by examiner

*Primary Examiner*—Akm E Ullah
(74) *Attorney, Agent, or Firm*—Brinks Hofer Gilson & Lione

(57) ABSTRACT

A flat panel display device includes a display area where pixel cells are defined by each of a plurality of data signal lines and a plurality of gate signal lines, and a plurality of inspection signal lines for inspecting line defects in the data signal lines and the gate signal lines of the display area include a connecting part in which a divided signal line overlaps underlying inspection signal lines with an insulating film therebetween.

7 Claims, 5 Drawing Sheets

FLAT PANEL DISPLAY DEVICE

PRIORITY CLAIM

This application claims the benefit of the Korean Patent Application No. P2005-0100887, filed on Oct. 25, 2005, which is hereby incorporated by reference.

TECHNICAL FIELD

The present invention relates, generally, to a flat panel display device and, more particularly, to a flat panel display device that is adapted for preventing wire breakage of a signal line caused by a voltage difference between inspection signal lines during an inspection process.

DESCRIPTION OF THE RELATED ART

Generally, a liquid crystal display device includes a liquid crystal display panel which controls the light transmittance of liquid crystal cells in accordance with a video signal so as to display a picture, and a drive circuit part for driving the liquid crystal display panel.

The liquid crystal display panel includes a lower array substrate and an upper array substrate bonded together facing each other; spacers for fixedly keeping a cell gap between the two substrates; and liquid crystal filled in a liquid crystal space provided by the spacers.

The upper array substrate includes a color filter for realizing color; a black matrix for preventing light leakage; a common electrode for commonly supplying a reference voltage to liquid crystal cells; an upper alignment film spread thereover for aligning liquid crystal.

The lower array substrate includes gate lines and data lines; a thin film transistor (hereinafter "TFT")formed at each of the crossing parts of the gate lines and the data lines; a pixel electrode formed for each liquid crystal cell to be connected to the TFT; and a lower alignment film spread thereover for aligning liquid crystal.

The liquid crystal display panel is completed by injecting the liquid crystal after separately making and bonding together the lower array substrate and the upper array substrate.

In particular, the lower array substrate goes through an inspection process for detecting the presence or absence of TFT defects and signal line defects, such as shorts, opens, and the like, in the signal lines after the fabrication process.

In the inspection process, wire breakage inspection of the signal line formed in the lower array substrate is performed and the presence or absence of a dot defect, or a line defect, or the like, is determined by using a mass production system (herein after "MPS")inspection device.

To this end, as shown in FIG. 1, the liquid crystal display panel 2 includes a display area 10 where liquid crystal cells are provided; and a non display area provided with data inspection pads 22, 24 and gate inspection pads 32, 34 which are formed in the outer area of the display area 10 to be used in the inspection process.

The display area 10 includes gate lines Gi; data lines Di crossing the gate lines Gi; a TFT, generally designated as element 12, formed adjacent to each of the crossing points of the gate lines Gi and the data lines Di; and a pixel electrode, generally designated as element 14, connected to the TFT 12.

The gate lines Gi are electrically connected to gate electrodes of the TFTs 12 to supply a gate signal thereto. The data lines Di are electrically connected to source electrodes of the TFTs 12 to supply a picture signal to the pixel electrodes 14 through the TFTs 12.

The TFTs 12 make the pixel signal of the data lines Di charged and kept in the pixel electrode 14 in response to a gate signal of the gate lines Gi. To this end, the TFTs 12 include gate electrodes connected to the gate lines Gi, source electrodes connected to the data lines Di, and drain electrodes connected to the pixel electrodes 14.

The pixel electrodes 14 are formed in the pixel area provided by the crossing of the gate lines Gi and the data lines Di, and are connected to the drain electrodes of the TFTs 12. The pixel electrodes 14 generate a potential difference with a common electrode (not shown) by the charged pixel voltage. The potential difference causes liquid crystal molecules to rotate by dielectric anisotropy. The transmittance of the light transmitted through the pixel area is changed in accordance with the degree of rotation of the liquid crystal display molecules, thereby realizing a picture.

The non display area includes the data inspection pads 22, 24 connected to the data lines Di for inspecting the data lines; and the gate inspection pads 32, 34 connected to the gate lines Gi for inspecting the gate lines. During the fabrication process, the data inspection pads 22, 24 and the gate inspection pads 32, 34 are removed by a scribing process after the MPS inspection process.

The data inspection pads 22, 24 supply MPS inspection signals required in the MPS inspection process to the data lines Di through the data pad 20 of the display area. The data inspection pads 22, 24 include an odd data inspection pad 22 connected to the odd data lines D1, D3, D5, . . . ; and an even data inspection pad 24 connected to the even data lines D2, D4, D6, . . . .

The odd data inspection pad 22 is connected to odd data pads 21 through an odd data inspection signal line 23, and the even data inspection pad 24 is connected to an even data pads 20 through an even data inspection signal line 25. In the prior art panel, there is generated a part (A) where the even data inspection signal line 25 crosses the odd data inspection signal line 23 in accordance with the location of the odd data pads 21. Accordingly, as shown in FIG. 2, in order not to generate a short in the part (A) where the even data inspection signal line 25 crosses the odd data inspection signal line 23, the even data inspection signal line 25 is made to jump over the odd data inspection signal line 23. That is to say, the even data signal line 25 is broken in the crossing part (A), a connecting part 50 is formed to overlap the broken part with an insulating film therebetween, and a plurality of contact holes 52 are formed in the connecting part 50 to connect the broken signal line 25. Accordingly, the odd data inspection pad 22 is connected to the odd data pads 21 through the odd data inspection signal line 23, but the even data pad 24 is connected to the even data pads 20 through the even data inspection signal line 25 and the connecting part 50.

The odd gate inspection pad 32 is connected to the odd gate pad 30 through the odd gate inspection signal line 33, and the even gate pad 34 is connected to the even gate pad 31 through the even gate inspection signal line 35. In the prior art panel, there is generated a part (A) where the even gate inspection line 35 cross the odd gate inspection signal line 33 in accordance with the location of the gate pads 30. Accordingly, as shown in FIG. 2, in order to make no short generated in the crossing part (A) of the even gate inspection signal line 35 and the odd gate inspection signal line 33, the even gate inspection signal line 35 is made to jump over the odd gate inspection signal line 33. That is to say, the even gate signal line 35 is broken in the crossing part (A), and a connecting part 50 is formed to overlap the broken part with an insulating film therebetween. And, a plurality of contact holes 52 are formed in the connecting part 50 to connect the broken signal line 35. Accordingly, the odd gate inspection pad 32 is connected to the odd gate pads 30 through the MPS odd gate line 33, but the even gate pad 34 is connected to the even gate pads 31 through the even gate inspection signal line 35 and the connecting part 50.

Upon the MPS inspection process of the liquid crystal display panel of such a configuration, an electrical signal is supplied to the gate lines Gi through the gate inspection pads 22, 24 and to the data lines Di through the data inspection pads 32, 34 through a measuring terminal of an inspection part (not shown). The presence or absence of defect of each signal line and the TFTs 12 is judged by the MPS inspection signal supplied to each of the gate lines Gi and the data lines Di.

However, upon MPS inspection of the liquid crystal display panel of the related art, because the high voltage MPS inspection signal is supplied to the MPS odd data/gate signal lines 23, 33 and the MPS even data/gate signal lines 25, 35, there is problematic voltage difference between the signal lines caused by the connecting part 50 in the crossing part (A) of the signal line where the connecting part 50 is formed.

SUMMARY

In accordance with an aspect of the invention, a flat panel display device includes a plurality of data signal lines and a plurality of gate signal lines, and a plurality of inspection signal lines for inspecting line defects in the gate signal lines and the data signal lines. A connecting part includes a divided signal inspection line crossing a signal line and an insulating film therebetween.

In accordance with another aspect of the invention, a flat panel display device includes a plurality of data signal lines and a plurality of gate signal lines. A data inspection signal line is coupled to the data signal lines and a gate inspection signal line is coupled to the gate signal lines. A cross over connection is included in which one of the data inspection signal line or the gate inspection signal overlaps the other inspection signal line, and one of the data inspection signal line or the gate inspection signal is divided into multiple lines and separated from the underlying signal line by an insulating film.

In yet another aspect of the invention, a flat panel display device includes a display area where pixel cells are defined by each of a plurality of data signal lines and a plurality of gate signal lines. A plurality of inspection signal lines are included for inspecting line defects in the gate signal lines and the data signal lines. A connecting part includes at least two connecting inspection signal lines electrically coupled to terminal ends of an signal inspection line, where the connecting inspection signal lines cross over an underlying signal line and are separated therefrom by an insulating film.

DETAILED DESCRIPTION

Figure 1:
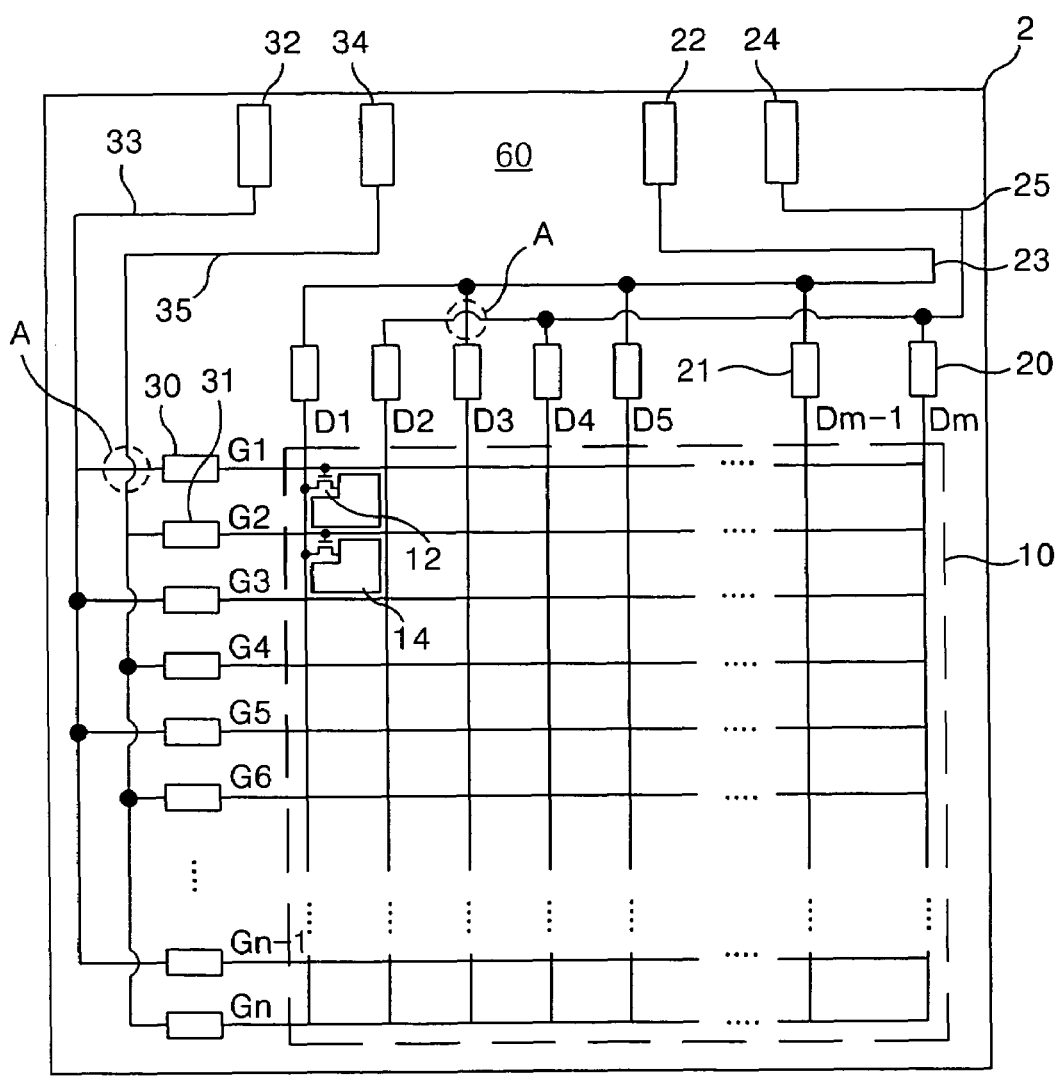
FIG. 1 is a schematic diagram of a liquid crystal display device of the related art.
Figure 2:
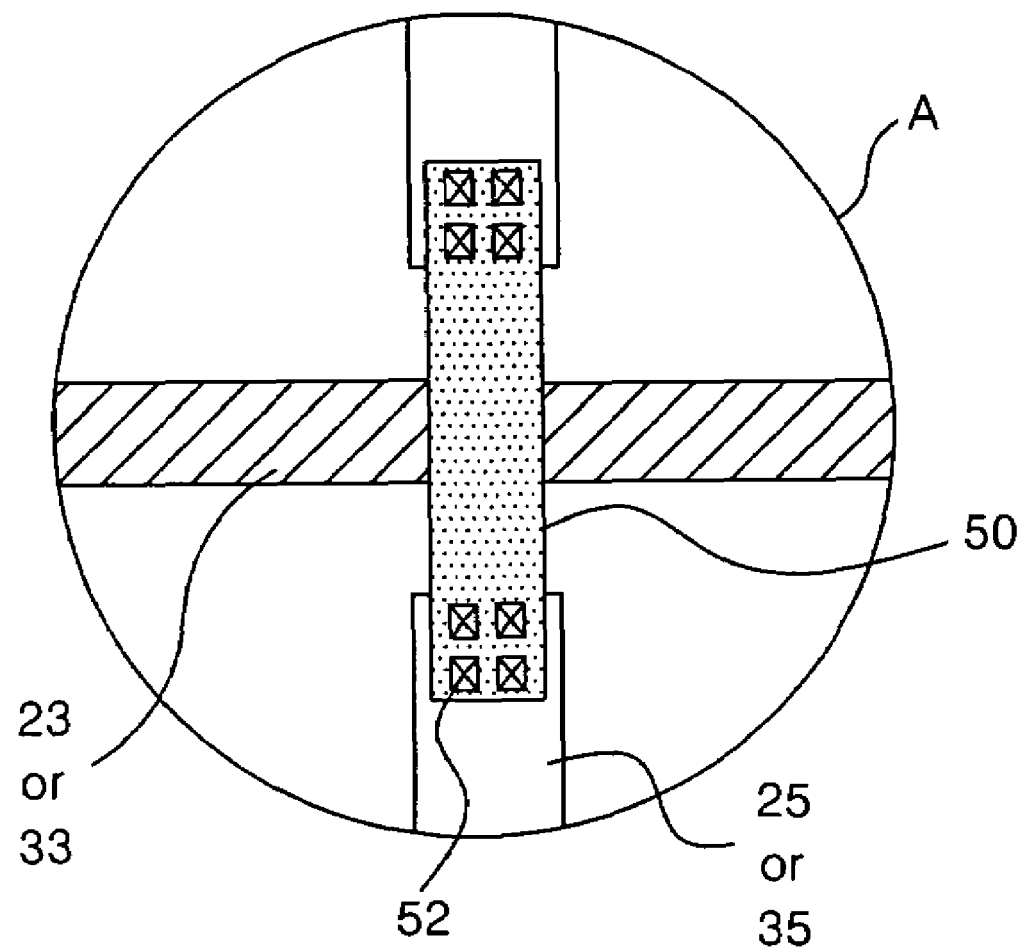
FIG. 2 is a detailed diagram illustrating part 'A' shown in FIG. 1.
Figure 3:
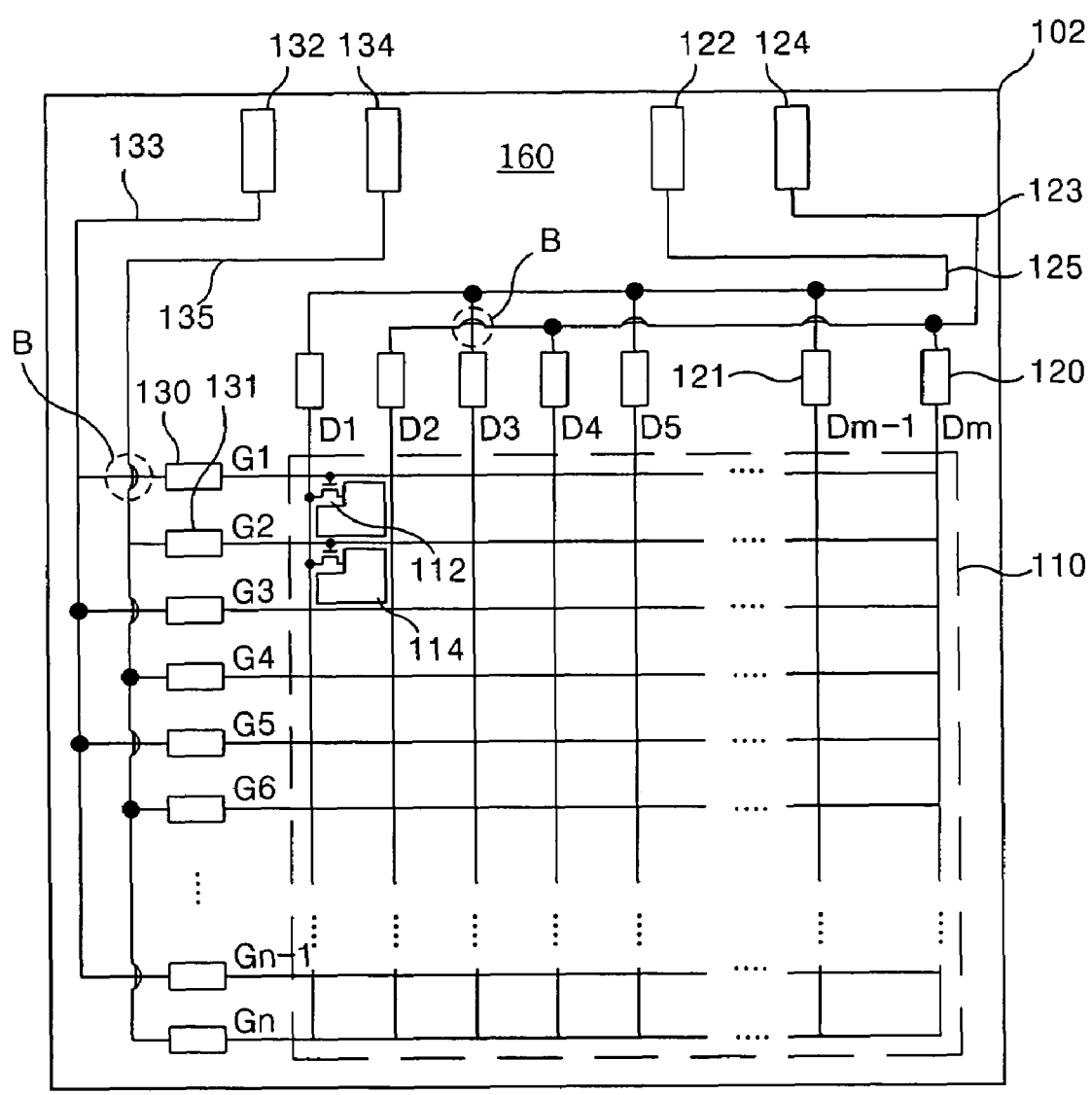
FIG. 3 is a schematic diagram of a liquid crystal display device according to an embodiment of the present invention.

Referring to FIG. 3, the liquid crystal display device according to the illustrated embodiment includes a display area 110 where liquid crystal cells are provided on a substrate 102, and a non display area 160 where data inspection pads 122, 124 and gate inspection pads 132, 134 which are formed outside the display area 110 and used in an inspection process.

The display area 110 includes gate lines Gi; data lines Di crossing the gate lines Gi; TFTs 112 formed at each crossing points of the gate lines Gi and the data lines Di; and pixel electrodes 114 connected to the TFTs 112.

The gate lines Gi are electrically connected to gate electrodes to supply a gate signal. The data lines Di are electrically connected to source electrodes of the TFTs 12 to supply a video signal to the pixel electrodes 114 through the TFTs 112.

The TFTs 112 make the video signal by transferring charge from the data lines Di for storage in the pixel electrodes 114 in response to the gate signals from the gate lines Gi. To this end, the TFTs 112 include a gate electrode connected to the gate lines Gi; a source electrode connected to the data lines Di; and a drain electrode connected to the pixel electrodes 114.

The pixel electrodes 114 are formed in a pixel area provided by the crossing of the gate lines Gi and the data lines Di connected to the source electrode of the TFTs 112. The pixel electrodes 114 generate a potential difference with a common electrode (not shown) by the charged pixel voltage. The potential difference causes liquid crystal molecules to rotate by dielectric anisotropy. The transmittance of the light transmitted through the pixel area is changed in accordance with the degree of rotation, thereby realizing a picture.

The non display area 160 includes data inspection pads 122, 124 connected to the data lines Di for inspecting the data lines, and gate inspection pads 132, 134 connected to the gate lines Gi for inspecting the gate lines. During fabrication, the data inspection pads 122, 124 and the gate inspection pads 132, 134 are removed by a scribing process after an MPS inspection process.

The data inspection pads 122, 124 supply MPS inspection signals required in the MPS inspection process to the data lines Di through a data pads 120. The data inspection pads 122, 124 include an odd data inspection pad 122 connected to the odd data lines D1, D3, D5, . . . ; and an even data inspection pad 124 connected to the even data lines D2, D4, D6, . . . .

Figure 4:
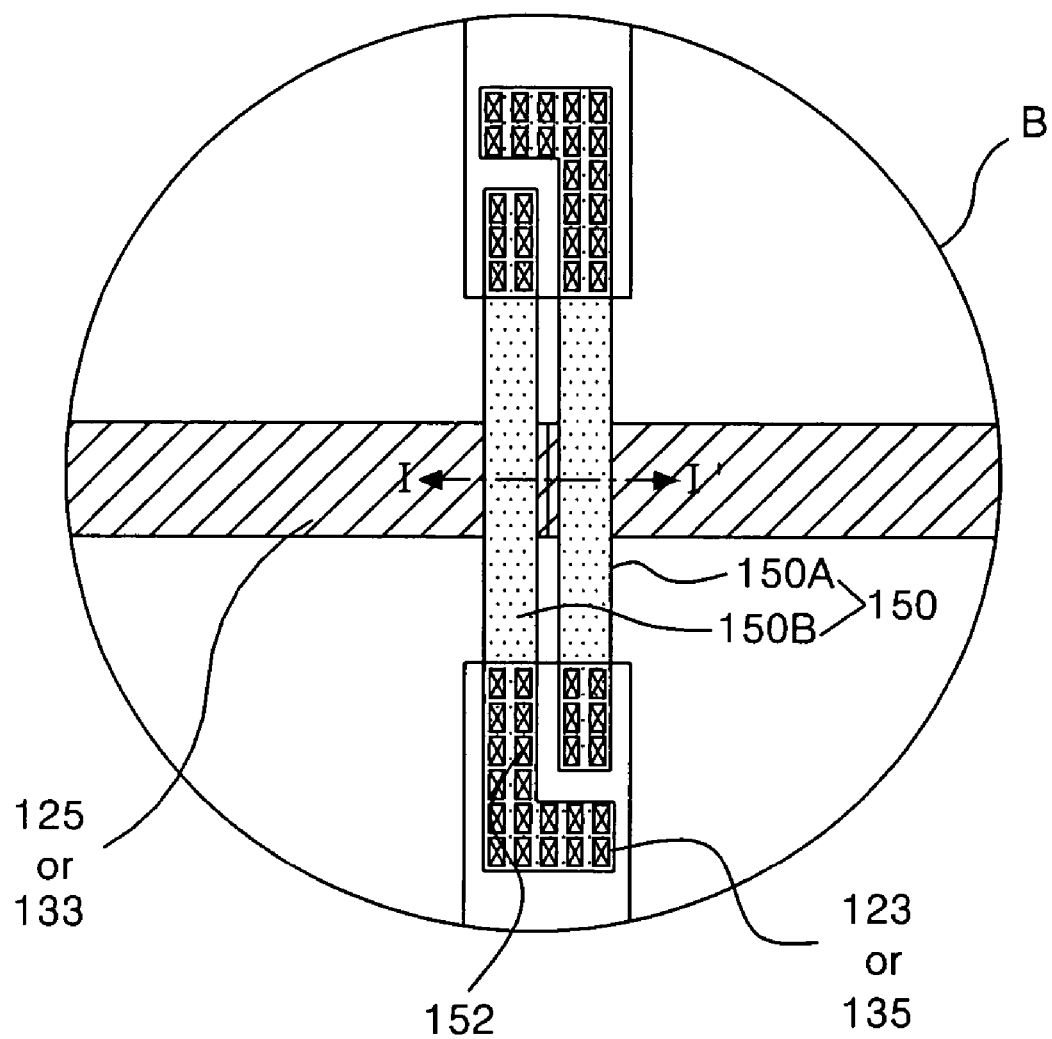
FIG. 4 is a detailed diagram illustrating part 'B' shown in FIG. 3.
Figure 5:
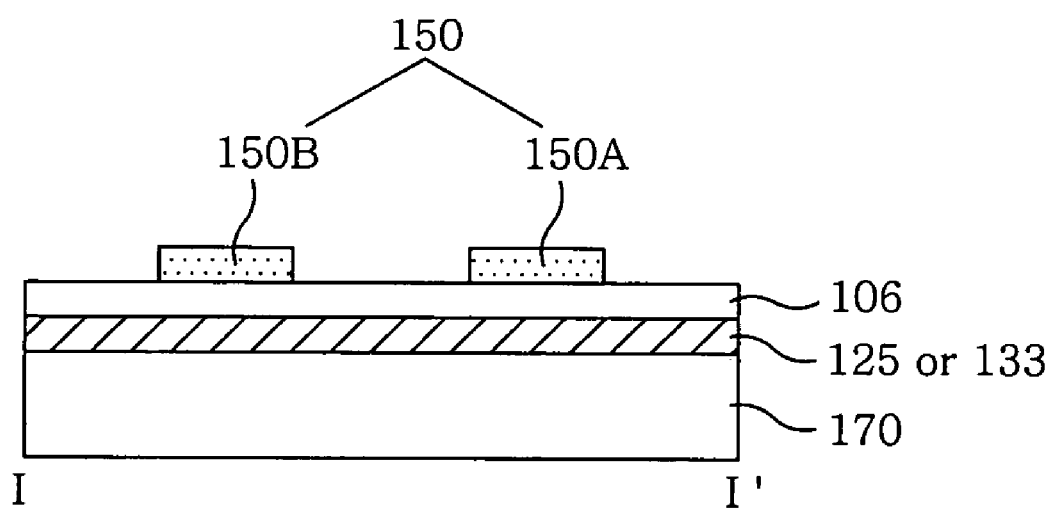
FIG. 5 is a cross-sectional view talent along section line I-I' of FIG. 4.

The odd data inspection pad 122 is connected to the odd data pads 121 through an odd data inspection signal line 125, and the even data inspection pad 124 is connected to the even data pads 120 through an even data inspection signal line 123. As illustrated in FIG. 3, a part (B) exits where the even data inspection signal line 123 crosses the odd data inspection signal line 125 in accordance with the locations of the data pads 121. Accordingly, as illustrated in FIGS. 4 and 5, in order not to generate an open in the part (B) where the even data inspection signal line 123 crosses the odd data inspection signal line 125, the even data inspection signal line 123 is divided to form a multi path on the substrate. That is to say, the even data inspection signal line 123 is divided in the crossing part (B) and a connecting part 150 having a plurality of connecting inspection signal lines 150A, 150B is formed to overlap the broken part with an insulating film 106 therebetween. A plurality of contact holes 152 are formed in the connecting part 150 to connect the broken even data inspection signal line 123.

The connecting part 150 according to the illustrated embodiment includes a first connecting inspection signal line 150A formed that overlaps the broken data inspection signal line 123 with an insulating film 106 therebetween; and a second connecting inspection signal line 150B formed to overlap the broken data inspection signal line 123 with the insulating film 106 therebetween parallel to the first connecting inspection signal line 150A.

The first connecting inspection signal line 150A is 'L' shaped where it overlaps the broken data inspection signal line 123. The first connecting inspection signal line 150A electrically connects the broken data signal line 123 through the contact holes 152 formed in upper and lower parts.

The second connecting inspection signal line 150B is also 'L' shaped to overlap the broken data inspection signal line 125, but is inverted with respect to connecting inspection signal line 150A. The second connecting inspection signal line 150B electrically connects the broken data inspection signal line 123 through the contact holes 152 formed in the upper and lower parts.

Accordingly, the odd data inspection pad 122 is connected to the odd data pads 121 through the odd data inspection signal line 125, but the even data inspection pad 124 is connected to the even data pads 120 through the even data inspection signal line 123, and through the first connecting inspection signal line 150A and the second connecting inspection signal line 150B.

The odd gate inspection pad 132 is connected to the odd gate pads 130 through the odd gate inspection signal line 133, and the even gate pad 134 is connected to the even gate pads 131 through the even gate inspection signal line 135. A part (B) exists where the even gate inspection signal line 135 cross the odd gate inspection signal line 133 in accordance with the location of the gate pads 130. Accordingly, as shown in FIG. 4 and 5, in order to avoid an open in the crossing part (B) of the even gate inspection signal line 135 and the odd gate inspection signal line 133, the even gate inspection signal line 135 is divided into a multi path. That is to say, the even gate inspection signal line 135 is broken in the crossing part (B), and a connecting part 150 is formed to overlap the broken part with an insulating film therebetween. And, a plurality of contact holes 152 are formed in the connecting part 150 to connect the broken signal line 135.

The connecting part 150 according to the embodiment of the present invention includes a first connecting inspection signal line 150A formed to overlap the broken gate inspection signal line 135 with the insulating film therebetween; and a second connecting inspection signal line 150B formed to overlap with the broken gate inspection signal line 135 with the insulating film therebetween and to be parallel to the first connecting inspection signal line 150A.

The first connecting inspection signal line 150A is 'L' shaped to overlap the broken gate inspection signal line 135. The first connecting inspection signal line 150A electrically connects the broken gate inspection signal line 135 through the contact holes 152 formed in upper and lower parts.

The second connecting inspection signal line 150B is also in a shape of 'L' to overlap the broken gate signal line 135, but is inverted with respect to inspection signal line 150A. The second connecting inspection signal line 150B electrically connects the broken gate inspection signal line 135 through the contact holes formed in the upper and lower parts.

Accordingly, the odd gate inspection pad 132 is connected to the odd gate pads 130 through the odd gate inspection signal line 133, but the even gate pad 134 is connected to the even gate pads 131 through the even gate inspection signal line 135, and the first connecting inspection signal line 150A and the second connecting inspection signal line 150B.

Upon the MPS inspection process of the liquid crystal display panel of such a configuration, an electrical signal is supplied to data lines Di through the data inspection pads 122, 124 and to the gate lines Gi through the gate inspection pads 132, 134 through a measuring terminal of an inspection part (not shown). The presence or absence of defect of each signal line and the TFTs 112 is judged by the MPS inspection signal supplied to each of the gate lines Gi and the data lines Di.

In this way, the liquid crystal display device according to the illustrated embodiment makes the crossing part (B) of the odd data inspection signal line 125, and the even gate inspection signal line 135 multi-jump through the first and second connecting inspection signal lines 150A, 150B upon the MPS inspection process to form the multi path, thereby making it possible to minimize the effect of wire breakage of the connecting part 150 through any one of the first and second connecting inspection signal lines 150A, 150B even though the other is broken.

Those skilled in the art will recognize that the odd or even signals illustrated and described above can be reversed. For example, the even data inspection signal line can be divided by the connecting part 150 rather than the odd data inspection signal line. Correspondingly, the odd gate inspection signal line can be divided by the connecting part 150 rather than the even gate inspection signal line.

Furthermore, in the liquid crystal display device according to the illustrated embodiment, the jump structure of the crossing part between the data inspection signal lines or the jump structure of the crossing part between the gate inspection signal lines is described, but the invention is not limited to these particular signal lines. For example, the same structure can be applied to the jump structures at the crossing points of other signal lines which supply the MPS inspection signal to the display area for MPS inspection.

Also, in the illustrated embodiment, the liquid crystal display device is taken as an example, but the present invention is not limited thereto and can be applied to others types of flat panel display devices that inspect the defects in the signal line with an MPS inspection device.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A flat panel display device comprising:
  a plurality of data lines and a plurality of gate lines;
  a plurality of inspection signal lines for inspecting line defects in the gate lines and the data lines; and
  a connecting part including a divided inspection signal line, the connecting part crossing an undivided inspection signal line and an insulating film therebetween,
  wherein the connecting part includes a first connecting inspection signal line and a second connecting inspection signal line,
  wherein the first connecting inspection signal line comprises an L-shaped structure and the second connecting inspection signal line comprises an L-shaped structure having an orientation reversed with respect to the first connecting inspection signal line.

2. The flat panel display device according to claim 1, wherein
the first connecting inspection signal line is electrically connected to a separated portion of the inspection signal line through a plurality of contact holes to form a first path; and
the second connecting inspection signal line is electrically connected to the separated portion of the inspection signal line through a plurality of contact holes to form a second path.

3. The flat panel display device according to claim 2, wherein the first connecting inspection signal line and the second connecting inspection signal line comprise parallel structures.

4. The flat panel display device according to claim 1, wherein the inspection signal lines comprise an odd data inspection signal line electrically connected to odd data lines, and an even data inspection signal line electrically connected to even data lines.

5. The flat panel display device according to claim 4, wherein the connecting part is formed at a crossing point of the odd data inspection signal line and the even data inspection signal line.

6. The flat panel display device according to claim 1, wherein the inspection signal lines comprise an odd gate inspection signal line electrically connected to an odd gate line and an even gate inspection signal line electrically connected to an even gate line.

7. The flat panel display device according to claim 6, wherein the connecting part is formed at a crossing point of the odd gate inspection signal line and the even gate inspection signal line.

* * * * *